United States Patent
Teng et al.

(10) Patent No.: US 12,083,701 B2
(45) Date of Patent: Sep. 10, 2024

(54) WORKING CONTROL MODULE OF WOODWORKING TENONING MACHINE

(71) Applicants: KING WOOMA INDUSTRIAL CO., LTD., Taichung (TW); Northtech Machine, LLC, Borden, IN (US)

(72) Inventors: Chiao-Fang Teng, Taichung (TW); Brandon Koetter, Borden, IN (US)

(73) Assignees: KING WOOMA INDUSTRIAL CO., LTD., Taichung (TW); NORTHTECH MACHINE, LLC, Borden, IN (US)

( * ) Notice: Subject to any disclaimer, the term of this patent is extended or adjusted under 35 U.S.C. 154(b) by 339 days.

(21) Appl. No.: 17/845,148

(22) Filed: Jun. 21, 2022

(65) Prior Publication Data

US 2023/0405864 A1    Dec. 21, 2023

(51) Int. Cl.
| | |
|---|---|
| B27F 1/08 | (2006.01) |
| B27C 5/00 | (2006.01) |
| B27C 7/00 | (2006.01) |
| B27F 5/02 | (2006.01) |
| G05B 19/4093 | (2006.01) |

(52) U.S. Cl.
CPC ............... B27F 1/08 (2013.01); B27C 5/00 (2013.01); B27C 7/00 (2013.01); B27F 5/02 (2013.01); G05B 19/40936 (2013.01); G05B 19/40938 (2013.01)

(58) Field of Classification Search
CPC ..... B27C 5/00; B27C 7/00; B27F 1/08; B27F 5/02; G05B 19/04936; G05B 19/40938; G06F 30/20
See application file for complete search history.

(56) References Cited

U.S. PATENT DOCUMENTS 5,203,389 A * 4/1993 Goodwin ............... B27C 9/005
144/134.1

FOREIGN PATENT DOCUMENTS

| | | | | | |
|---|---|---|---|---|---|
| CN | 106182228 B | * | 6/2018 | ............ | G06F 30/20 |
| CN | 210939734 U | * | 7/2020 | ............ | B27F 1/00 |
| CN | 212399853 U | * | 1/2021 | ............ | B27B 5/00 |
| CN | 215987811 U | * | 3/2022 | ............ | G09B 25/00 |
| CN | 113283101 B | * | 8/2022 | ............ | G06F 30/20 |
| FR | 3001876 A1 | * | 8/2014 | ......... | A47B 47/0075 |

\* cited by examiner

*Primary Examiner* — Crystal J Barnes-Bullock
(74) *Attorney, Agent, or Firm* — Chun-Ming Shih; LANWAY IPR SERVICES

(57) ABSTRACT

A working control module of a woodworking tenoning machine is configured to work a wood material in a desired tenoning shape by using a human machine interface (HMI). The working control module contains: a tool selection module, a tenoning shape selection module, a model calculation module, a three-dimensional (3D) drawing module, a working path module, a feeding module, a working module, and a material returning module. Thereby, the user is capable of selecting the desired tenon shape, inputting the at least one characteristic variable of the desired tenon shape to draw, view or amend the 3D model by using the HMI of the working control module. After confirming the 3D model, the wood material is worked in the desired tenon shape automatically, thus enhancing working efficiency and working accuracy.

2 Claims, 1 Drawing Sheet

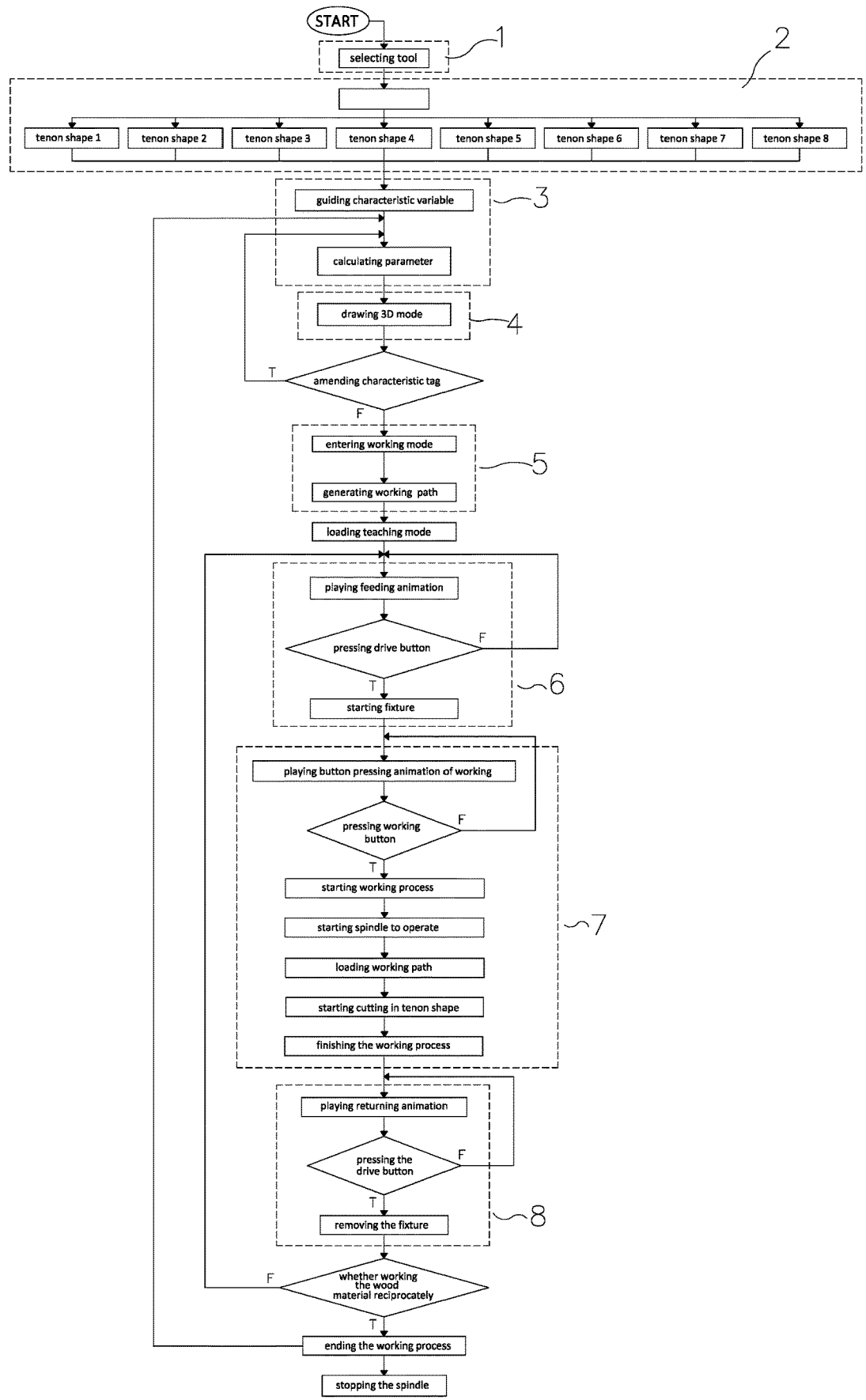

WORKING CONTROL MODULE OF WOODWORKING TENONING MACHINE

FIELD OF THE INVENTION

The present invention relates to a working control module of a woodworking tenoning machine which configured to work a wood material in a desired tenoning shape by using a human machine interface (HMI), and the user is capable of selecting the desired tenon shape, inputting the at least one characteristic variable of the desired tenon shape to draw, view or amend the 3D model by using the HMI of the working control module. After confirming the 3D model, the wood material is worked in the desired tenon shape automatically, thus enhancing working efficiency and working accuracy.

BACKGROUND OF THE INVENTION

A conventional woodworking tenoning machine contains a fixture configured to clamp a wood material, a spindle having a tool for cutting and working the wood material automatically.

However, when desiring to change different shapes, widths, and thicknesses of the wood materials, a user has to calculate desired different shapes, widths, and thicknesses of the wood materials and to input quantities, depths and distances of tenons and tongues-and-grooves of the wood materials. Then, the conventional woodworking tenoning machine is started again to work the wood material, thus having troublesome working process and poor working accuracy.

Furthermore, the user has to input at least one characteristic variable of the desired tenon shape so that multiple specification values are calculated, and a working result cannot be learned in advance.

The present invention has arisen to mitigate and/or obviate the afore-described disadvantages.

SUMMARY OF THE INVENTION

The primary object of the present invention is to provide a working control module of a woodworking tenoning machine which configured to work a wood material in a desired tenoning shape by using a human machine interface (HMI), and the user is capable of selecting the desired tenon shape, inputting the at least one characteristic variable of the desired tenon shape to draw, view or amend the 3D model by using the HMI of the working control module. After confirming the 3D model, the wood material is worked in the desired tenon shape automatically, thus enhancing working efficiency and working accuracy.

To obtain above-mentioned aspect, a working control module of a woodworking tenoning machine provided by the present invention contains: a tool selection module, a tenoning shape selection module, a model calculation module, a three-dimensional (3D) drawing module, a working path module, a feeding module, a working module, and a material returning module.

The tool selection module is configured to select a tool based on the desired tenon shape.

The tenoning shape selection module includes multiple tenoning-shape codes built in a database thereof so that the desired tenon shape is selected from the database.

A wood specification of the desired tenon shape is input into the model calculation module and the wood specification of the desired tenon shape includes parameters of a width and a thickness of a wood material, and the parameters are guided into at least one characteristic variable of the desired tenon shape so that the model calculation module calculates multiple specification values which are quantities, widths, radiuses and depths of tenons and tongues-and-grooves.

The 3D model drawing module is configured to draw and present a 3D model diagram of the desired tenon shape based on the multiple specification values so that a user confirms or changes the 3D model diagram of the desired tenon shape when desiring to amend the desired tenon shape, and the 3D model drawing module redraws a new 3D model diagram based on at least one changed characteristic variable of the at least one characteristic variable, and the user confirms the 3D model diagram.

The working path module is configured to generate a working path of the desired tenon shape.

A teaching mode is loaded into the feeding module to play at least one feeding animation, and the user presses a drive button of the cylinder to start a cylinder of the woodworking tenoning machine, and a fixture of the woodworking tenoning machine is driven by the cylinder to clamp the wood material.

A working button of the working module is pressed to drive a spindle of the working module and the working path is loaded into the working module to cut and work the wood material in the desired tenon shape.

After the wood material is worked, the material returning module plays at least one returning animation to teach the user to remove the fixture by pressing the driving button of the cylinder.

BRIEF DESCRIPTION OF THE DRAWINGS

FIG. 1 is a schematics view showing the working process of a working control module of a woodworking tenoning machine according to a preferred embodiment of the present invention.

DETAILED DESCRIPTION OF THE PREFERRED EMBODIMENTS

With reference to FIG. 1, a working control module of a woodworking tenoning machine according to a preferred embodiment of the present invention is configured to overcome above-mentioned defects by using a human machine interface (HMI), and the working control module comprises a tool selection module 1, a tenoning shape selection module 2, a model calculation module 3, a three-dimensional (3D) drawing module 4, a working path module 5, a feeding module 6, a working module 7, and a material returning module 8, such that the tool selection module 1 is configured to select a tool based on a desired tenon shape, the tenoning shape selection module 2 includes multiple tenoning-shape codes built in a database thereof so that the desired tenon shape is selected from the database, and a wood specification of the desired tenon shape is input into the model calculation module 3, wherein the wood specification of the desired tenon shape includes parameters of a width and a thickness of a wood material, and the parameters are guided into at least one characteristic variable of the desired tenon shape so that the model calculation module 3 calculates multiple specification values which are quantities, widths, radiuses and depths of the tenons and the tongues-and-grooves. The 3D model drawing module 4 is configured to draw and present a 3D model diagram of the desired tenon shape based on the multiple specification values so that a user confirms or changes the 3D model diagram of the desired tenon shape when desiring to amend the desired tenon shape, for example, when desiring to change the specification values (such as the quantities) of the tenons and the tongues-and-grooves, the user operates the working control module to move back to the model calculation module 3 so that the model calculation module 3 calculates, guides, and redraws a new 3D model diagram based on at least one changed characteristic variable of the at least one characteristic variable, and the user confirms the 3D model diagram. Thereafter, the working path module 5 is configured to generate a working path of the desired tenon shape, a teaching mode is loaded into the feeding module 6 to play at least one feeding animation, the user presses a drive button of the cylinder to start a cylinder of the woodworking tenoning machine, and a fixture of the woodworking tenoning machine is driven by the cylinder to clamp the wood material, then a working button of the working module 7 is pressed to drive a spindle of the working module 7 and the working path is loaded into the working module 7 to cut and work the wood material in the desired tenon shape. After the wood material is worked, the material returning module 8 plays at least one returning animation to teach the user to remove the fixture by pressing the driving button of the cylinder. Thereafter, the feeding module 6 is operated again when desiring to work another wood material. On the contrary, the spindle of the working module 7 is stopped after pressing a stop button of the working module 7.

Thereby, the user is capable of selecting the desired tenon shape, inputting the at least one characteristic variable of the desired tenon shape to draw, view or amend the 3D model by using the HMI of the working control module. After confirming the 3D model, the wood material is worked in the desired tenon shape automatically, thus enhancing working efficiency and working accuracy.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A working control module of a woodworking tenoning machine being configured to work a wood material in a desired tenoning shape by using a human machine interface (HMI), and the working control module comprising: a tool selection module, a tenoning shape selection module, a model calculation module, a three-dimensional (3D) drawing module, a working path module, a feeding module, a working module, and a material returning module;

wherein the tool selection module is configured to select a tool based on the desired tenon shape;

wherein the tenoning shape selection module includes multiple tenoning-shape codes built in a database thereof so that the desired tenon shape is selected from the database;

wherein a wood specification of the desired tenon shape is input into the model calculation module and the wood specification of the desired tenon shape includes parameters of a width and a thickness of a wood material, and the parameters are guided into at least one characteristic variable of the desired tenon shape so that the model calculation module calculates multiple specification values which are quantities, widths, radiuses and depths of tenons and tongues-and-grooves;

wherein the 3D model drawing module is configured to draw and present a 3D model diagram of the desired tenon shape based on the multiple specification values so that a user confirms or changes the 3D model diagram of the desired tenon shape when desiring to amend the desired tenon shape, and the 3D model drawing module redraws a new 3D model diagram based on at least one changed characteristic variable of the at least one characteristic variable, and the user confirms the 3D model diagram;

wherein the working path module is configured to generate a working path of the desired tenon shape;

wherein a teaching mode is loaded into the feeding module to play at least one feeding animation, and the user presses a drive button of the cylinder to start a cylinder of the woodworking tenoning machine, and a fixture of the woodworking tenoning machine is driven by the cylinder to clamp the wood material;

wherein a working button of the working module is pressed to drive a spindle of the working module and the working path is loaded into the working module to cut and work the wood material in the desired tenon shape;

wherein after the wood material is worked, the material returning module plays at least one returning animation to teach the user to remove the fixture by pressing the driving button of the cylinder.

2. The working control module as claimed in claim 1, wherein when desiring to amend the quantities of the tenons and the tongues-and-grooves, the user operates the working control module to move back to the model calculation module so that the model calculation module calculates, guides, and redraws at least one changed characteristic variable of the at least one characteristic variable according to the at least one changed characteristic variable, and the user confirms the 3D model diagram.

* * * * *